United States Patent [19]

Pell

[11] Patent Number: 4,966,788
[45] Date of Patent: Oct. 30, 1990

[54] PROCESS FOR MARKING GUIDE LINES ON ROOFING MAT

[76] Inventor: Edward A. Pell, 3310 Hacienda Way, Antioch, Calif. 94509

[21] Appl. No.: 357,222

[22] Filed: May 26, 1989

[51] Int. Cl.⁵ .................. B05D 5/00; B05D 1/02; B05D 1/36; B05D 7/24
[52] U.S. Cl. .................. 427/210; 427/211; 427/286
[58] Field of Search ............... 427/210, 211, 286, 209; 118/304, 315

[56] References Cited

U.S. PATENT DOCUMENTS

| | | |
|---|---|---|
| 1,249,734 | 12/1917 | Foster ........................ 427/209 X |
| 1,636,750 | 7/1927 | Miller ........................ 427/209 |
| 1,756,989 | 5/1930 | Overbury .................... 427/210 X |
| 2,039,776 | 5/1936 | Caton ........................ 427/209 |
| 4,102,301 | 7/1978 | Reade et al. ................ 118/67 |

Primary Examiner—Evan Lawrence

[57] ABSTRACT

Paint is sprayed in a line onto a fiber glass mat just prior to the mat being impregnated with hot asphalt. The temperature of the asphalt causes the paint solvent to flash, the process of which prevents the asphalt from displacing the pigment, leaving the paint pigment in place in the body of the mat. A number of such lines may be formed on the mat at predetermined spaced locations to serve as installation guide lines for the roofer.

8 Claims, 2 Drawing Sheets

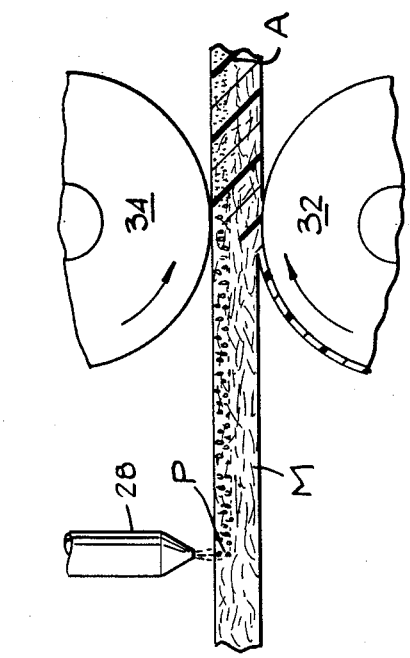
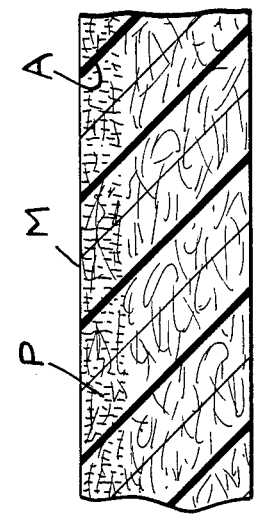
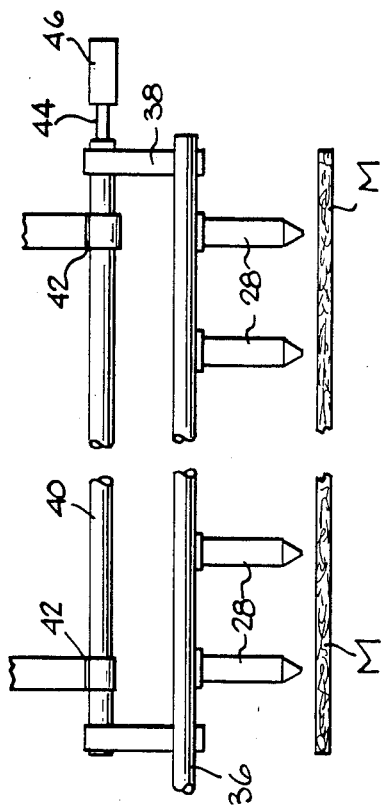
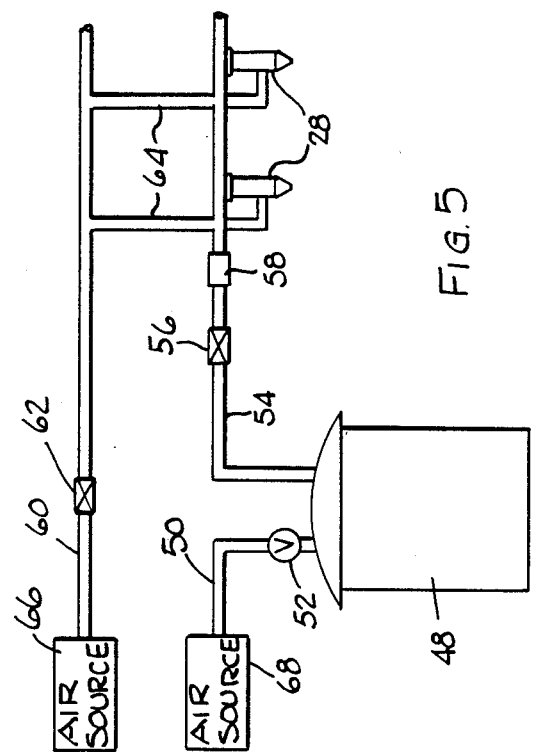

PROCESS FOR MARKING GUIDE LINES ON ROOFING MAT

FIELD OF THE INVENTION

This invention relates to the production of asphalt impregnated roofing mats. More particularly, it relates to the provision of roofing application guide lines on such a mat.

BACKGROUND OF THE INVENTION

Roofing paper or mat is commonly provided with guide lines which are useful to workmen in applying built-up roofing. The lines are typically parallel to each other and spaced apart a predetermined distance so that when used as a guide for the edge of the next course of mat, overlapping layers of the mat can be readily applied according to the type of coverage desired. For example, when mat is applied with its upper edge aligned with a particular guide line double coverage of the roof would result; when aligned with another particular line, triple coverage would result, and so on.

Although various types of indicia have been used to form the guide lines the most desirable is a marking formed of paint. A paint line can readily be seen by the roofer and allows guide lines of different colors to be employed, with the colors being correlated to the various roof coverages likely to be used.

Paint guide lines are commonly formed by the so-called "marking wheel" method. In this method a number of discs are mounted on a common shaft adjacent the moving web of mat in a roofing machine. The shaft extends in a transverse direction to the movement of the web and is located downstream from the asphalt application station. The bottom portions of the discs move through a reservoir of paint, picking up a sufficient amount to be deposited onto the adjacent surface of asphalt impregnated mat. Although this process results in colored guide lines useful to the roofer in the application of the roofing product, the method of applying the paint tends to cause problems.

The very high speeds at which the mat travels in a modern roofing machine leaves little tolerance for variations in the amount of paint applied. If too little is applied the guide line may be too faint to be easily discerned in the field. If too much is applied, the paint tends to build up on the various rolls of the roofing machine located downstream from the paint application station. This eventually requires premature shutdown of the machine for cleaning, resulting in excessive down-time. In addition, too much paint tends to cause cracking of the roofing paper, apparently caused by the inability of the paper to take up stresses at the locations of paint during its high speed run through the roofing machine. To the extent that excessive amounts of paint resemble imperfections in the mat, too much paint also tends to make the web susceptible to sailing, or moving in a transverse direction from its intended path of movement.

It would be highly desirable to be able to mark roofing paper with painted guide lines in order to derive the beneficial aspects of such markings, but without the detrimental features associated with the normal method of paint application.

SUMMARY OF THE INVENTION

In accordance with the invention, instead of applying paint to the surface of a mat which has been impregnated or saturated with asphalt, it is applied prior to the application of asphalt. The subsequent application of hot asphalt encounters the paint before the vehicle carrying the paint pigment has evaporated, causing flash evaporation of the vehicle. As a result of the phenomenon produced by this action, pigment is left in the interstices of the mat where they had been penetrated by the paint, thus extending for a distance into the mat rather than merely being supported on the outer surface of the asphalt impregnated mat. Preferably, the paint is a water based paint and the mat is a fiber glass mat.

The tendency of the mat to sail as it moves through the roofing machine is reduced by the ability of the inventions to apply smaller quantities of paint than prior art paint application methods, and the dry pigment on the mat which contacts downstream rollers does not undesirably transfer and build up on the rollers.

These and other aspects of the invention, as well as other benefits thereof, will readily be ascertained from the more detailed description of the preferred embodiment of the invention which follows.

BRIEF DESCRIPTION OF THE DRAWINGS

FIG. 4 is a view of the paint applicator, taken along line 4—4 of FIG. 3;

FIG. 5 is a schematic view of a portion of the paint application system;

FIG. 6 is an enlarged partial sectional view of the roofing mat, showing the mat during application of paint and asphalt; and FIG. 7 is a still more enlarged partial sectional view of the roofing mat of FIG. 6, showing the mat after the application of asphalt.

DESCRIPTION OF THE PREFERRED EMBODIMENT

Figure 1:
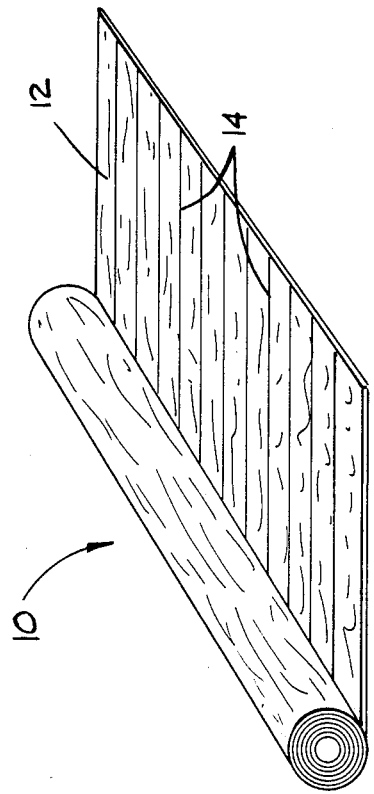
FIG. 1 is a pictorial view of a roll or roofing paper or mat containing the guide lines of the present invention.

Referring to FIG. 1, a roll of roofing paper 12 is shown as containing guide lines 14 produced in accordance with the present invention. As illustrated, a number of guide lines are provided, allowing a roofer to lay up the roofing paper in a built-up roof in accordance with a predetermined amount of roof coverage. For example, ten guide lines may be provided on a felt 36 inches wide in order to present a number of different roofing lay-up possibilities.

Figure 2:
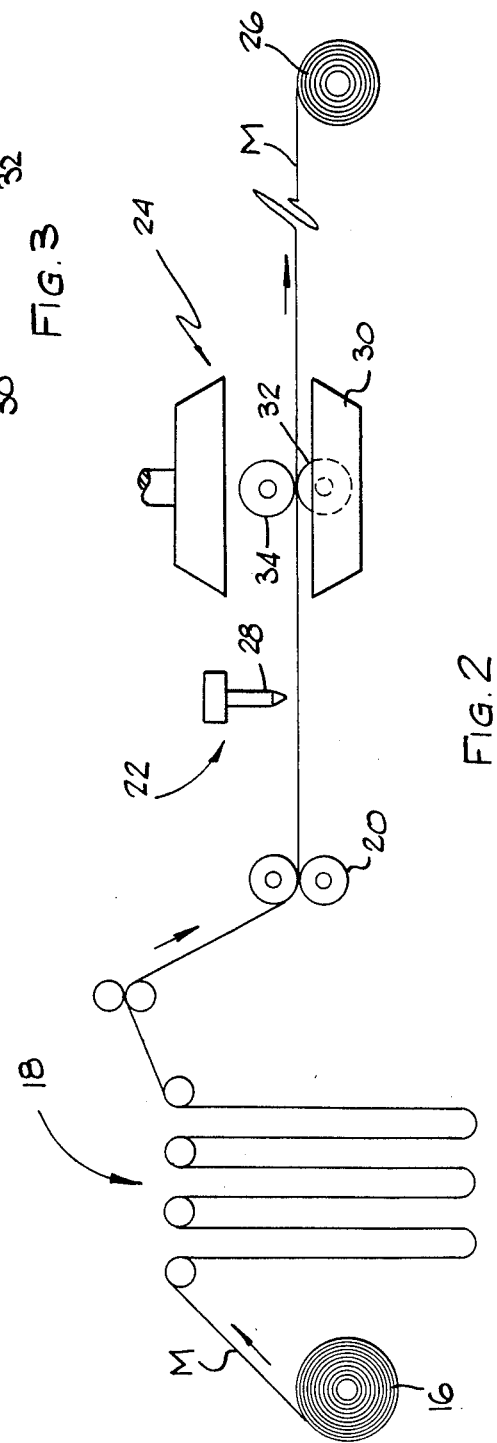
FIG. 2 is a schemtic view of a portion of the roofing mat manufacturing machine, showing the asphalt application station and the paint application station.

As shown in FIG. 2, roofing mats are typically formed on a roofing machine by drawing the mat M from a roll 16 of fibrous material. Preferably, the mat is comprised of a bonded fiber glass mat of the type commonly used in the roofing industry. Although the parameters of the mat may vary, such a mat typically is quite thin and porous and light in weight, a common size being 36 inches wide and about 23 mils thick. After the mat is drawn from the roll, it passes through a conventional dry looper 18 for the purpose of providing excess material to allow the machine to continue running during a work stoppage due to a roll changeover or due to some other cause such as an imperfection in the mat. Following the looper the mat proceeds through the rolls 20 to the paint application station 22 and the asphalt application station 24 before proceeding to the wind-up roll 26. It will be understood that the illustration of the roofing machine is highly schematic and omits many of the elements of a complete machine. It should be noted, however, that in accordance with the invention the paint application station is located just upstream from the asphalt application station.

Figure 3:
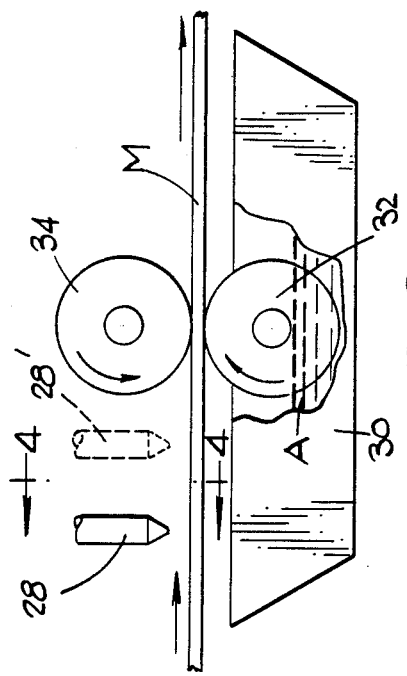
FIG. 3 is an enlarged view of the paint and asphalt application stations of FIG. 2.

Referring now to FIGS. 2 and 3, the paint application station 22 is depicted by the end spray nozzle 28 of a row of spray nozzles and the asphalt application station is depicted as comprising a reservoir 30 of hot fluid asphalt A. The asphalt is applied in conventional manner, by a lower roller 32 mounted so that its lower portion rotates through the hot asphalt and its upper portion contacts the lower side of the mat M, thereby transferring asphalt to the mat. An upper roller 34 backs the lower roller 32 and is in contact with the upper surface of the mat. The amount of asphalt transferred to the mat and the pressure applied by the rollers 32 and 34 results in the asphalt being uniformly distributed throughout the thickness of the mat.

Referring to FIG. 4, the nozzles 28 are shown as being connected to a paint supply manifold 36 which is supported by legs 38 depending from support structure 40. Although the manifold may be suported by any suitable support structure, the support 40 has been illustrated as being a shaft slidably mounted in support bushings 42. The movable rod 44 of a solenoid 46 is connected to the slidable support structure 38 and 40 so that movement of the rod in either direction will cause the support structure and connected manifold to move in a direction transverse to the downstream travel of the web. Actuation of the solenoid 46 would be caused by a system which detects the transverse movement of the web, which may comprise circuit means including mechanical or other means for detecting transverse movement of an edge of the web.

Referring now to FIG. 5, the arrangement for delivering the paint to the nozzles is schematically shown as including a sealed tank or container 48 to which a low pressure air line 50 is connected through a suitable valve 52. The line 54 leading from the tank delivers the paint to the manifold 36 through solenoid valve 56 and filter 58. A high pressure air line 60 conducts air at a pressure in the range of 50-100 psig through valve 62 to the various flexible connecting hoses 64 leading to the nozzles 28. The high pressure air is delivered to the line 60 from a suitable source 66 for the purpose or purging the nozzles should it be necessary to rid them of dirt or any other obstruction which impedes the steady spray of paint from the nozzles. The low pressure air is delivered from a suitable source 68 for the purpose of propelling the paint through the nozzles. The pressure of the air delivered to the tank 48 is preferably in a narrow low range, such as 2-5 psig, with pressures at the low end of the range being recommended.

As shown in FIG. 6, when paint P is sprayed onto the mat M it travels for a distance into the mat, penetrating the interstices between the fibers along the line of the spray from the nozzle 28. In the form in which it leaves the nozzle and initially penetrates the mat, the paint comprises pigment and a carrier vehicle or solvent. It is in this form that the paint is shown in FIG. 6.

As illustrated in FIG. 6, the spray nozzles 28 are located close to the asphalt application rolls 32 and 34. Because of this relationship and because the web moves through the roofing machine at such a high speed, the portions of the mat which have received the marking paint almost immediately reach the nip of the rolls 32 and 34 and are contacted by the hot asphalt A. Since the temperature of the asphalt at this point is very high compared to the evaporation point of the paint solvent, typically being in the range of about 420° to about 500° F., The heat immediately causes the paint solvent to evaporate. Because the flashing of the solvent is a turbulent process of evaporation, the extremely rapid conversion of the liquid solvent to gas somewhat shields the portion of the mat containing the paint, and the asphalt penetrates this portion of the mat at a slower rate than it penetrates the other portions of the mat. As a result, the asphalt does not immediately flow in to envelop the pigment remaining after the paint solvent has evaporated off, but is prevented from doing so by the flashing phenomenon until the asphalt has cooled to a nonflowable state, leaving a minute void in which the pigment remains and is clearly visisble when viewing the upper surface of the mat.

Although the pigment does not normally penetrate through to the undersurface of the mat, it has been noted that the location of the guide lines can be discerned from the underside of the mat, the lines showing up as faint tracings or shadow lines of the actual guide lines.

The condition of the mat along a paint line after leaving the asphalt applicator rolls is depicted in FIG. 7, wherein the remaining pigment of the paint is indicated at P and the other interstices of the mat are substantially filled with asphalt. It will be understood that the asphalt quickly cools upon leaving the asphalt applicator rolls 32 and 34 to the point where there is no tendency for it to flow into the interstices containing the pigment after the mat leaves the asphalt application station. If desired, asphalt cooling equipment can be installed downstream from the asphalt application station to further ensure against undersirable flow of asphalt into the interstices, but this has not been found to be necessary.

It will be appreciated that the mat representations in both FIGS. 6 and 7 are greatly enlarged for the purpose of illustrating the invention. Actually, roofing mats of the type involved are very thin, typically being only about 23 mils in thickness up to about 40 mils. The drawings do, however, correctly illustrate the principle of operation involved.

Although the parameters of operation may vary depending on the thickness and density of the felt and the speed of the web, it has been found that low paint application pressures are desirable to prevent the paint from being sprayed entirely through the mat. Small nozzle openings and a location of the nozzles only a short distance above the mat are preferred in order to maintain a thin, fairly precise guide line. It has been found that low viscosity paint functions best, merely requiring the use of ordinary commercial paint which has been diluted to the desirable viscosity. While there is no set distance that the spray nozzles should be located upstream from the asphalt applicator rolls, the distance should be short enough to prevent the paint solvent from prematurely evaporating before the asphalt is applied. Preferably, the nozzles should be located no more than about 3 and 4 feet upstream from the asphalt applicator rolls.

Although the invention can be carried out with either organic base paints or water base paints, water base paints are preferred. With water base paints there is no emission of volatile organics and no difficult clean-up in the event paint is spilled over the machinery or floor in the vicinity of the paint applicator, and the installation of costly air and waste water treatment systems is avoided.

It will be understood that while the invention has been described in connection with a single paint container and with a single paint line leading to all the nozzles, in practice a different container and different associated manifolds would be provided for each different color of paint. Thus, the dotted line representation 28' of the spray nozzle in FIG. 3 would comprise the end nozzle in a separate spray nozzle manifold arrangement. All of the manifolds would, however, be supported by a common transversely movable support structure in the event it is desired for all of the nozzles to move as a unit in order to track transverse movement of the web.

It will now be appreciated that the invention permits colored application guide lines to be painted onto a roofing mat without causing cracking of the roofing mat or the transfer and build-up of paint on downstream rolls. The paint lines themselves are readily visible in the field, being resistant to smudging or deletion caused by scuffing or other harsh treatment due to the fact that the paint pigment is present within the mat down to a certain depth.

Although described in connection with the manufacture of roofing mats employed in the construction of a built-up roof, the invention can obviously be used to mark mats used for other purposes, including mats used as the underlayment for roofing shingles.

Although the nozzles have been described as delivering a constant spray of paint in order to produce a continuous paint line, the operation could be made intermittent if desired in order to produce interrupted guide lines.

It should now be understood that the invention is not necessarily limited to all the specific details described in connection with the preferred embodiment, but that changes to certain features of the preferred embodiment which do not affect the overall basic function and concept of the invention may be made by those skilled in the art without departing from the spirit and scope of the invention, as defined in the appended claims.

What is claimed is:

1. A method for applying indicia to a fibrous web with paint, comprising the steps of:
   continuously moving a fibrous web along a predetermined path;
   spraying a relatively small amount of paint onto a major surface of the web, to mark the web the paint comprising pigment in a solvent base; and
   applying hot asphalt to the opposite major surface of the web at a location downstream from the paint spraying location to impregnate the web with the hot asphalt, the temperature of the hot asphalt being sufficient to cause evaporation of the solvent, leaving the pigment of the paint in place.

2. A method according to claim 1, wherein a plurality of continuous lines of paint are sprayed onto the web.

3. A method according to claim 1, wherein the solvent is water.

4. A method according to claim 1, wherein the fibrous web is a fiber glass mat.

5. A method according to claim 4, wherein the fibrous mat has interstices therein and the paint extends into some of the interstices near the first-mentioned major surface of the mat.

6. A method according to claim 5, wherein the temperature of the asphalt is in the range of about 420° F. to about 500° F.

7. A method according to claim 5, wherein the mat has a thickness in the approximate range of 23 mils to 40 mils.

8. A method according to claim 7, wherein the paint is sprayed onto the mat at a pressure in the approximate range of 2 psig to 5 psig.

* * * * *